(12) United States Patent
Gee et al.

(10) Patent No.: US 8,842,940 B1
(45) Date of Patent: Sep. 23, 2014

(54) MULTIPROCESSOR DISCRETE WAVELET TRANSFORM

(75) Inventors: John K. Gee, Mount Vernon, IA (US); Jennifer A. Davis, Cedar Rapids, IA (US); David W. Jensen, Marion, IA (US); James N. Potts, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 542 days.

(21) Appl. No.: 12/572,600

(22) Filed: Oct. 2, 2009

(51) Int. Cl.
*G06K 9/36* (2006.01)
*G06K 9/46* (2006.01)
*G06K 9/54* (2006.01)
*G06K 9/60* (2006.01)
*H04N 7/12* (2006.01)
*H04N 11/02* (2006.01)
*H04N 11/04* (2006.01)

(52) U.S. Cl.
USPC ....... 382/302; 382/240; 382/248; 375/240.19

(58) Field of Classification Search
USPC .................. 382/166, 240, 248, 302, 304; 375/240.19
See application file for complete search history.

(56) References Cited

U.S. PATENT DOCUMENTS

| | | | | |
|---|---|---|---|---|
| 4,636,942 A | * | 1/1987 | Chen et al. | 710/269 |
| 5,982,938 A | * | 11/1999 | Dube | 382/240 |
| 6,201,897 B1 | * | 3/2001 | Nixon | 382/248 |
| 6,259,819 B1 | * | 7/2001 | Andrew et al. | 382/248 |
| 7,565,018 B2 | * | 7/2009 | Srinivasan | 382/232 |
| 2001/0024530 A1 | * | 9/2001 | Fukuhara et al. | 382/240 |
| 2002/0141499 A1 | * | 10/2002 | Goertzen | 375/240.12 |
| 2003/0055856 A1 | * | 3/2003 | McCanny et al. | 708/400 |
| 2003/0063811 A1 | * | 4/2003 | Kajiwara | 382/240 |
| 2008/0285874 A1 | * | 11/2008 | Fukuhara et al. | 382/248 |

OTHER PUBLICATIONS

Ortega et al. ("Implementations of the discrete wavelet transfor: complexity, memory, and parallelization issues" SPIE vol. 3813, Jul. 1999, pp. 386-400).*

* cited by examiner

*Primary Examiner* — Yubin Hung
(74) *Attorney, Agent, or Firm* — Donna P. Suchy; Daniel M. Barbieri

(57) ABSTRACT

The present invention includes an image processing system with several data compression processing units connected together with a communication bus. Each data compression processing unit includes a wavelet transform processing unit, a shared register file and an address computation processing unit. The wavelet transform processing unit decomposes data from one or more segments of an image into wavelets using a discrete wavelet transform. The shared register stores the intermediate wavelet coefficient computations. The address computation processing unit identifies addresses of wavelets to be decomposed by subsequent operation of the wavelet transform processing unit. The system also includes storage where the resultant wavelet coefficients from each segment may be stored. The present invention also includes methods of compressing image data using multiple processors where each processor operates on a segment of the image data.

11 Claims, 5 Drawing Sheets

16 PROCESSORS FOR 640 X 480 PIXELS

| 0,0 | 160,0 | 320,0 | 460,0 |
|---|---|---|---|
| 0000 | 0001 | 0010 | 0011 |
| 159,119 | 319,119 | 479,119 | 639,119 |
| 0,120 | 160,120 | 320,120 | 480,120 |
| 0100 | 0101 | 0110 | 0111 |
| 159,239 | 319,239 | 319,239 | 319,239 |
| 0,240 | 160,240 | 320,240 | 480,240 |
| 1000 | 1001 | 1010 | 1011 |
| 159,359 | 319,359 | 479,359 | 639,359 |
| 0,360 | 160,360 | 320,360 | 480,360 |
| 1100 | 1101 | 1110 | 1111 |
| 159,479 | 319,479 | 479,479 | 638,479 |

FIG. 4B

MULTIPROCESSOR DISCRETE WAVELET TRANSFORM

CROSS REFERENCE TO RELATED APPLICATIONS

This application relates to the following applications filed on even date herewith and each incorporated herein by these references in their entirety:

Optical Helmet Tracking System by Jaclyn A. Hoke and David W. Jensen having application Ser. No. 12/572,542 and filing date of Oct. 2, 2009.

Custom Efficient Optical Distortion Reduction System and Method by David W. Jensen, Richard D. Tompkins and Susan Robbins having application Ser. No. 12/572,669; filing date of Oct. 2, 2009; U.S. Pat. No. 8,125,406 and issue date of Feb. 28, 2012.

Multiple Aperture Video Imaging System by David W. Jensen and Steven E. Koenck application Ser. No. 12/572,492 and filing date of Oct. 2, 2009.

FIELD OF THE INVENTION

The present invention relates to improved systems and methods of data compression and more particularly to improved systems and method of compression image data using the JPEG2000 standard.

BACKGROUND OF THE INVENTION

The JPEG2000 image compression standard provides high compression ratios but is computationally complex and therefore slow. This is particularly problematic in the area of video compression where slow compression leads to jumpy or otherwise unacceptable video play back rates. Several method have been suggested to speed up the compression, however, each is high cost or otherwise does not provide a sufficient increase in speed to justify the increased cost.

The JPEG2000 standard may utilize an iteratively applied discrete wavelet transform (DWT) 5/3 as part of the compression algorithm. This pseudo-code describes the odd and even wavelet transforms:

```
// DWT, ROW, ODD i
x[i]=x[i]-(x[i-1]+x[i+1])/2;
// DWT, ROW, EVEN i
x[i]=x[i]+(new_x[i-1]+new_x[i+1]+2)/4;
```

The initial step of DWT decomposes the data into a set of basis functions called wavelets through the use of low pass and high pass filters. The wavelets result in interleaved data. A lifting scheme has been proposed to speed up the compression. The lifting scheme deinterleaves the data and creates 4 subbands (i.e. LL, HL, LH, HH) for 2D images. The next decomposition would then operate on the LL subband. For each decomposition, the lifting scheme is used to deinterleave the data. The deinterleaving process results in the moving of large amounts of data; for each decomposition, almost all of the data must be moved, although with each successive decomposition the amount of data is reduced by three quarters. The movement of data through deinterleaving is a primary drawback to the DWT compression algorithms. The data movement necessary to deinterleave is shown in FIG. 2.

The present invention overcomes one or more of these problems.

SUMMARY OF THE INVENTION

The present invention includes an image processing system with several data compression processing units connected together with a communication bus. Each data compression processing unit includes a wavelet transform processing unit, a shared register file and an address computation processing unit. The wavelet transform processing unit decomposes data from one or more segments of an image into wavelets using a discrete wavelet transform. The shared register stores the intermediate wavelet coefficient computations. The address computation processing unit identifies addresses of wavelets to be decomposed by subsequent operation of the wavelet transform processing unit. The system also includes storage where the resultant wavelet coefficients from each segment may be stored.

The present invention also includes methods of compressing image data using multiple processors where each processor operates on a segment of the image data. After the image is divided into segments, each segment is decomposed using a discrete wavelet transform on a wavelets transform processing unit. The address of each wavelet is tracked in a shared register and the addresses of certain wavelets are passed back to the wavelet transform processing unit, where the wavelets are decomposed again. This resultant loop is carried out several times. Wavelets to be passed back are selected by $2^N$ where N is the Nth layer of decomposition with the first decomposition designated the 0th layer.

BRIEF DESCRIPTION OF THE DRAWINGS

In the drawings:

FIGS. 4a and 4b show 4 and 16 data compression processing units that are used in the systems of the present invention.

DETAILED DESCRIPTION

The present invention comprises systems and methods for compressing data that are low power and low cost while also providing high performance. In a preferred embodiment, the present invention provides system and methods that result in compressed data that meets the JPEG2000 standard. Consequently, the system and method are most useful for compressing images, although it may be suitable for other types of data as well.

Figure 1:
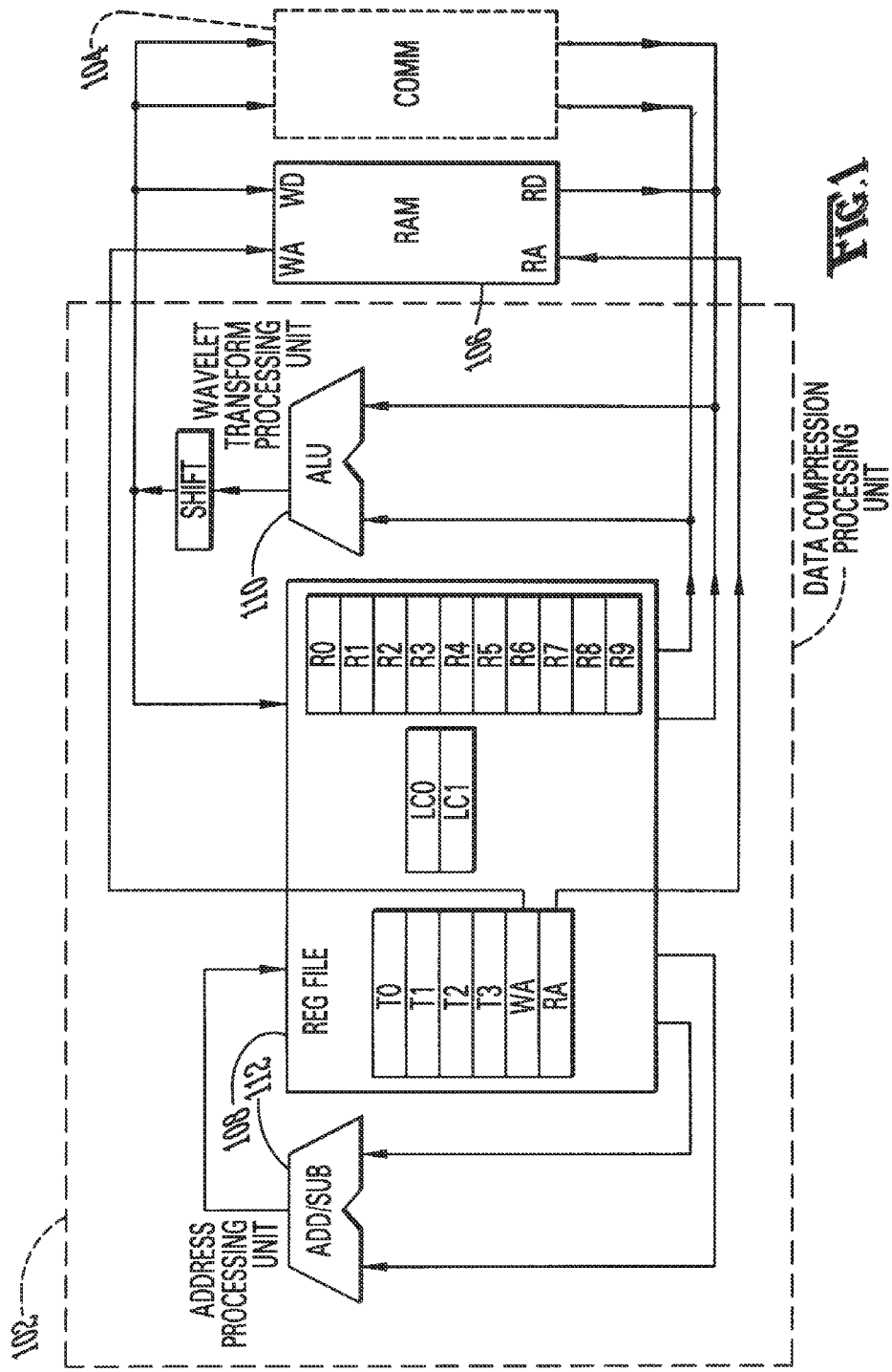
FIG. 1 shows schematically one data compression processing unit used in the systems of the present invention.
Figure 2:
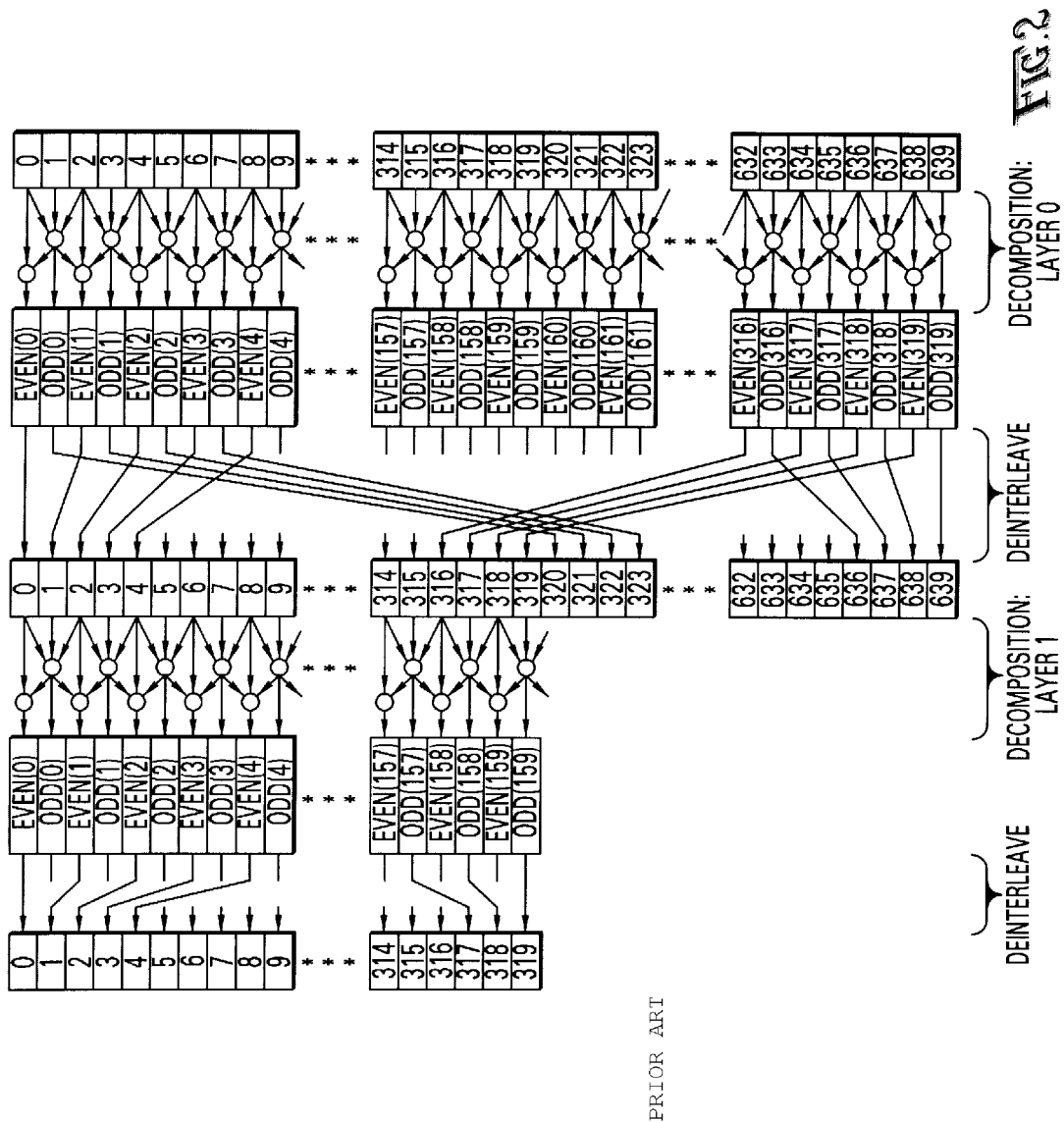
FIG. 2 shows that amount of data movement required by lifting schemes used in prior art discrete wavelet transforms.

As seen in FIG. 1, the present invention includes a system that comprises a data compression processing unit (DCPU) 102. The DCPU may be a general purpose processing unit that runs software to carry out the data compression algorithm discussed below. In the alternative, the DCPU may be a purpose built processing unit that carries out the data compression algorithm discussed below. Purpose built is used to mean that data compression algorithm can be implemented in hardware or microcoded software on the processing unit. For example, an application specific integrated circuit (ASIC) could be a purpose build processing unit.

Also as seen in FIG. 1, the systems of the present invention may also include other components commonly found in computer systems such as communications devices 104, displays, I/O devices, and the necessary buses to allow all the components to communicate with each other. The system also comprises storage, which may or may not be integrated or co-located with other components of the system. Storage includes memory registers, cache, RAM 106, memory or non-volatile storage such as hard drives.

The DCPU includes at least a shared register 108, a wavelet transform processing unit (WTPU) 110 and an address computation processing unit (ACPU) 112.

The shared register file 108 on the DCPU may take any form suitable and may include such things as cache, RAM or other non-volatile storage. Preferably, the shared register file is located on the chip with the DCPU and/or as part of the DCPU. The shared register file includes one or more registers where data may be stored. The one or more registers are preferably accessible by both WTPU and the ACPU.

The WTPU decomposes the input data into wavelets. This is accomplished in JPEG2000 by running first a vertical transform followed by a horizontal transform to achieve a 2D transform for the image data. Each pair of horizontal and vertical transforms may be termed a decomposition or a decomposition layer. There is no need to deinterleave the data and so the subbands corresponding to LL, HL, LH and HH are not created. Rather, the wavelet coefficients are held in place e.g. at an address in RAM 106. By holding the wavelet coefficients in place, resources that may have been spent on data movement can be directed to other operations, such as additional computation.

Figure 3:
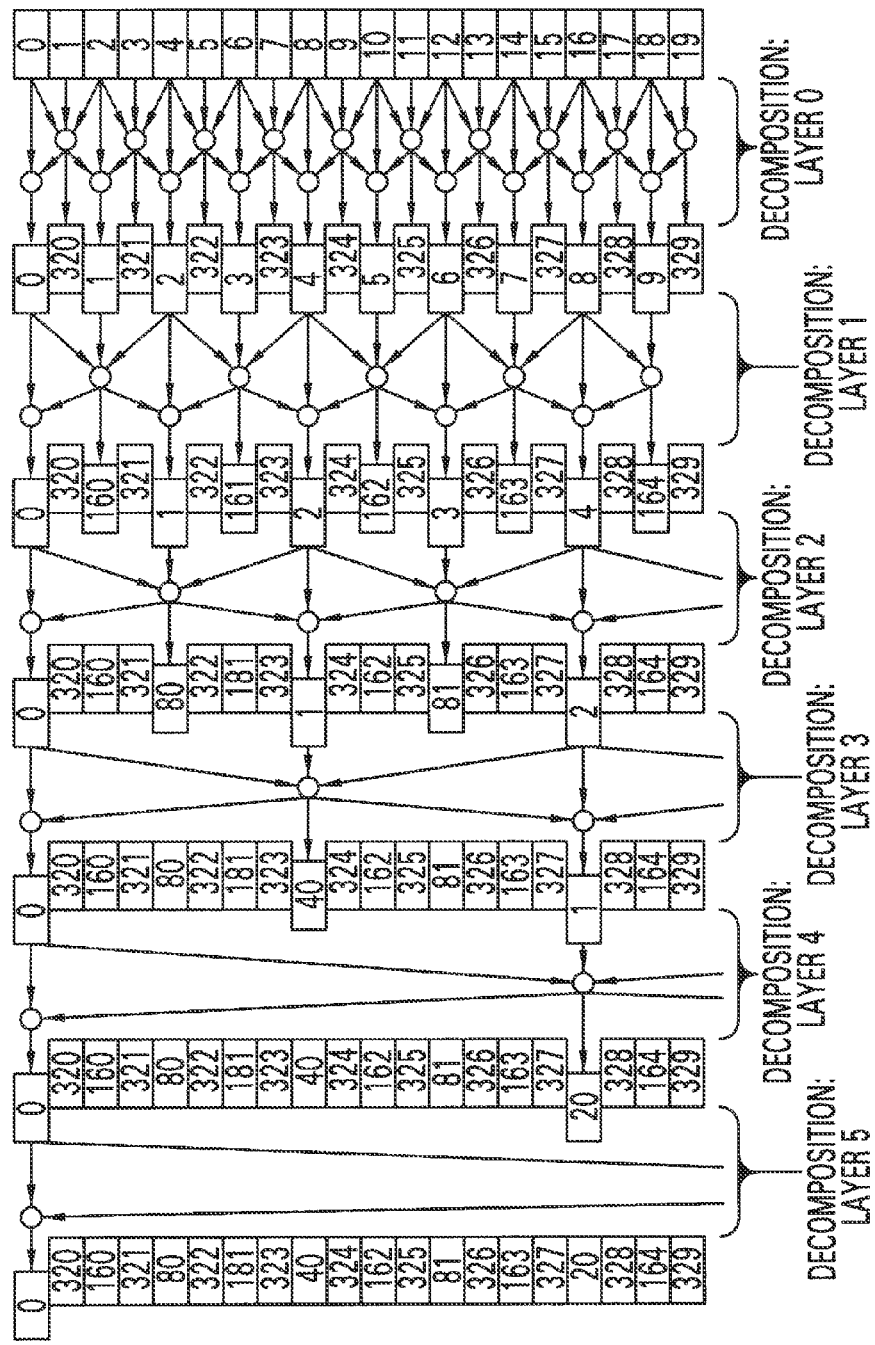
FIG. 3 shows the discrete wavelet transform in the absence of a lifting scheme.

The ACPU uses the shared register file to keep track of the address in RAM 106 where each wavelet coefficient is stored. Tracking the addresses of the wavelet coefficients eliminates the need to deinterleave the data to perform subsequent decompositions on the data. Tracking the addresses of the wavelet coefficients is straight forward. For each decomposition, a subset of wavelet coefficients from the previous decomposition will be used as inputs. The wavelet coefficients to be used are identified by the ACPU; that is, the ACPU increments the addresses of the wavelet coefficients. An increment of $2^N$ is used by the ACPU where N is the decomposition layer, with the first decomposition layer denoted the $0^{th}$ layer. The $1^{st}$ decomposition layer denotes the second decomposition. Thus, for the $0^{th}$ layer, the address of every bit of data is tracked (i.e. $2^0=1$). For the $1^{st}$ layer, the address of every other bit of data is tracked (i.e. $2^1=2$). As can be seen, the number of addresses that need to be tracked exponentially decreases. Thus, by the $4^{th}$ layer (i.e. the fifth decomposition), only the address of every $16^{th}$ bit of data will need to be tracked. This is illustrated in FIG. 3, where the effect of multiple layers of decomposition is shown on the first twenty bits of data in an image.

The WTPU and the ACPU work in parallel to each other in order to eliminate the need to deinterleave the data. As the WTPU 110 decomposes the image data, the ACPU 112 tracks the address of the wavelet coefficients to be used in the each decomposition. The ACPU 112 then provides these addresses to the RAM 106, so that the WTPU 110 can perform decomposition on the data in the RAM 106 at the locations specified by the ACPU 112. The interrelated operation is shown in FIG. 1 where the WTPU 110 reads and writes data (wavelet coefficients) to and from the RAM 106 at the RD (read data) and WD (write data) ports. The ACPU 112 generates addresses for wavelet coefficients in the RAM 106 for all reads and writes of the WTPU 110. ACPU 112 addresses are stored in the RA (read address) and WA (write address) registers (denoted REG FILE) shown in FIG. 1. RA and WA are connected directly to the RA (read address) and WA (write address) ports of the RAM 106. Thus, the WTPU 110 operates on the wavelet coefficient data from RAM 106 in parallel with the ACPU 112 computing wavelet coefficient addresses for the RAM 106 for current and future decompositions. To unwind the final DWT coefficients from their inplace order in RAM 106, the ACPU 112 generates the non-consecutive addresses necessary to allow the WTPU 110 to read the data in the traditional order. These inorder coefficients may be used as input to JPEG-2000 EBCOT processing or may be sent on to other processing elements.

The DCPU preferably iterates up to five times through decomposition; however, additional iterations (i.e. layers of decomposition) are also contemplated for images that are particularly large or otherwise initially contain large amounts of data.

Psuedo-code of the wavelet transform performed by the WTPU is shown below:
// DWT, ROW, ODD i
x[i]=x[i]−(x[i−delta]+x[i+delta])/2;
// DWT, ROW, EVEN i
x[i]=x[i]+(new_x[i−delta]+new_x[i+delta]+2)/4;
Where delta is current layer of decomposition, with delta=1 for the first layer, delta=2 for the second layer, delta=4 for the third layer, etc.

Figure 4A:
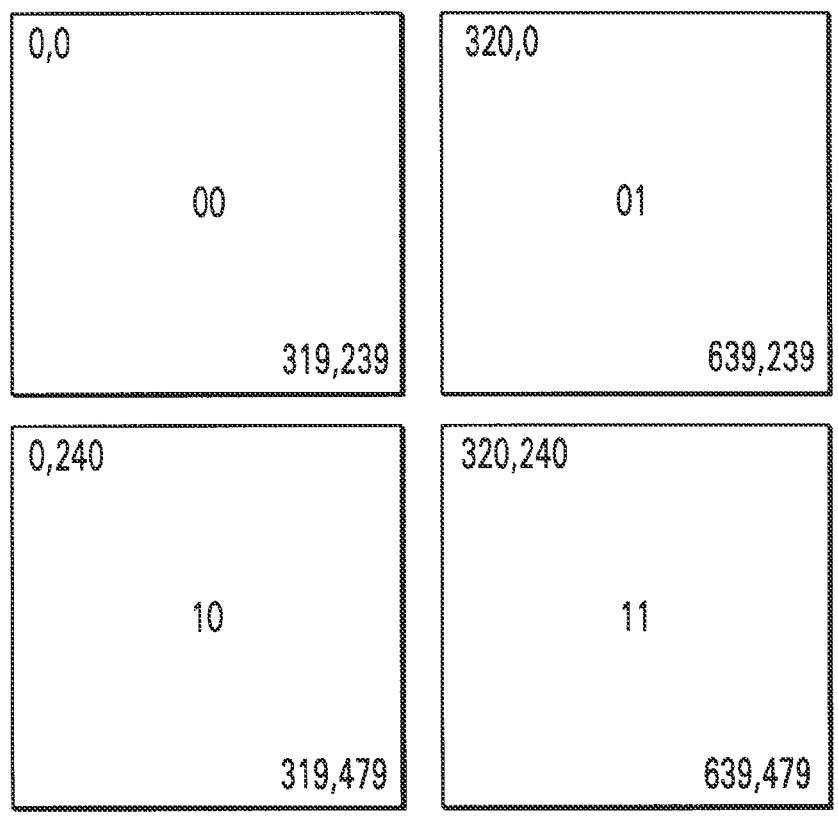

In addition to reducing the amount of data movement required, increased performance is also obtained through the use of a plurality of DCPUs. Each DCPU operates on a segment of the data, e.g. a tile of the image. For instance, for a given number of DCPUs, an image is easily segmented so as to provide a portion of the image to each DCPU. FIG. 4a shows how a 640×480 pixel image would be segmented across four DCPUs. That is, pixels 0,0 to 319, 329 would be decomposed by DCPU 00, while pixels 320,0 to 639,239 would be handled by DCPU 01, etc. FIG. 4b shows how a 640×480 pixel image would be segmented across sixteen DCPUs. The number of processors is preferably selected according to $N^2$ where N is 2, 4, 8, 16, 32, 64, 128, 256, 512, 1024, but integers in between the listed integers are also contemplated. In addition to a plurality of individual processors, multiple DCPU may be implemented on a multicore processor such that each core corresponds to one DCPU. Thus, the plurality of DCPUs may be implemented on one or more multicore processors.

The benefit of segmenting the image lies in the simultaneous decomposition of each segment of the image. For example, with sixteen DCPUs, each decomposition step will take about $\frac{1}{16}^{th}$ of the time as running the decomposition on one processor. Overall, the time saving should be on the order of (N−1)/N, where N is the number of processors utilized.

After the DCPUs have completed the needed decomposition steps, then embedded block coding with optimized truncation (EBCOT) is performed on the data. EBCOT is defined in the JPEG2000 standard and may be used as is. In a preferred embodiment, the WTPU performs the EBCOT on the same data block that it processed in the decomposition(s); however, this is not necessarily the case. The ACPU preferably provides the addresses of the data on which the EBCOT is to be performed. Again, a speed gain can be obtained because of the lack of data movement that is required to carry out the EBCOT.

After DWT and EBCOT on each processor, the data is streamed out in an appropriate order to a designated processor. The designated processor assembles the data in the proper format to meet the JPEG2000 standard. That is, the data will preferably be stored, and preferably, stored in a format compatible with the JPEG2000 standard. The designated process may be one of the plurality of DCPUs used to carry out the DWT or EBCOT or may be in addition to the plurality of DCPUs.

The pseudo-code below show one possible method of coordinating the operation of the WTPU and the ACPU. Namely, the semicolon in the pseudo-code shows the division of labor between the two processing units. The pseudo-code on the left of the semicolon is for the WTPU and the pseudo-code on the right of the semicolon is for the ACPU.

```
// DWT, ROW, x0=EVEN, x1=EVEN(sn=dn+1)
delta2=delta+delta;
westOUT=x[x0];
eastOUT=x[x0+sn+dn-delta];
i=x0+delta;
for (j=0; j<dn; j++){
   x[i]-=(x[i-delta]+x[i+delta])>>1; i+=delta2;)
}
i=x0;
x[i]+=(westIN+x[i+delta]+2)>>2; i+=delta2;
for (j=0; j<sn-2; j++) {
   x[i]+=(x[i-delta]+x[i+delta]+2)>>2; i+=delta2;
}
x[i]+=(x[i-delta]+eastIN+2)>>2; i+=delta2;
// DWT, ROW, x0=ODD, x1=ODD(sn+1=dn)
delta2=delta+delta;
i=x0;
x[i]-=(westIN+x[i+delta])>>1; i+=delta2;
for (j=0; j<dn-2; j++) {
   x[i]-=(x[i-delta]+x[i+delta])>>1; i+=delta2;
}
x[i]-=(x[i-delta]+eastIN)>>1; i+=delta2;
westOUT=x[x0];
eastOUT=x[x0+sn+dn-delta];
i=x0+1;
for (j=0; j<sn; j++) {
   x[i]+=(x[i-delta]+x[i+delta]+2)>>2; i+=delta2;
}
// DWT, ROW, x0=EVEN, x1=ODD(sn=dn)
delta2=delta+delta;
westOUT=x[x0];
i=x0+delta;
for (j=0; j<dn-1; j++) {
   x[i]-=(x[i-delta]+x[i+delta])>>1; i+=delta2;
}
x[i]-=(x[i-delta]+eastIN)>>1; i+=delta2;
eastOUT=x[i-delta2];
i=x0;
x[i]+=(westIN+x[x0+delta]+2)>>2; i+=delta2;
for (j=0; j<sn-1; j++) {
   x[i]+=(x[i-delta]+x[i+delta]+2)>>2; i+=delta2;
}
// DWT, ROW, x0=ODD, x1=EVEN(sn=dn)
delta2=delta+delta;
eastOUT=x[x0+sn+dn-delta];
i=x0;
x[i]-=(westIN+x[i+delta])>>1; i+=delta2;
for (j=0; j<dn-1; j++) {
   x[i]-=(x[i-delta]+x[i+delta])>>1; i+=delta2;
}
westOUT=x[x0];
i=x0+delta;
for (j=0; j<sn-1; j++) {
   x[i]+=(x[i-delta]+x[i+delta]+2)>>2; i+=delta2;
}
x[i]+=(x[i-delta]+eastIN+2)>>2; i+=delta2;
```

In this embodiment, because the operation of the WTPU and ACPU are coordinated, the ACPU need not pass the address information to the WTPU directly. Rather, the ACPU passes the write addresses and read addresses to the storage (e.g. RAM), thus bypassing the WTPU. In addition to the systems of the present invention, methods of data compression are also contemplated. While any data may be a suitable operant for these methods, image data is the preferred operant. The methods include steps of segmenting the original data set into smaller blocks of data, decomposing the segmented data and tracking the addresses of the decomposed data. The last two steps are preferably carried out concurrently and iteratively. Preferably, the method also includes truncating the decomposed data.

The segmenting step includes dividing the image into portions on which to run the wavelet transform. Namely, the image is divided into a number of segments that corresponds to the total number data compression processing units. For sixteen data compression processing units, the image is divided into sixteen segments.

For each segment, a beginning pixel address and an ending pixel address is identified. As seen in FIG. 4a, for 640×480 image segmented on a four processor system, the first segment has a beginning pixel address is 0,0 and the ending pixel address is 319,239. Thus, processor 00 is used to do computations on these pixels.

While the image is preferably divided evenly so that each processor operates on the same number of pixels, this is not necessarily the case because image size is not always easily divisible by the number of processors.

Once the data is segmented, the decomposing step is carried out. Namely, wavelets are created by a discrete wavelet transform of the segmented data. Next, the tracking step is carried out on the decomposed data. Namely, the location of each decomposed wavelet is stored in a shared register after the first decomposing step (i.e. the $0^{th}$ layer). The tracking step also passes the addresses for the data of interest for the next decomposition step; e.g. every other datum for the $1^{st}$ layer, every $4^{th}$ datum for the $2^{nd}$ layer. The decomposing step then repeats, but only on the data identified as of interest in the previous tracking step. The decomposing and tracking steps loop at least once; that is, complete the $0^{th}$ and $1^{st}$ layer decompositions, but preferably loop two or more time; that is, complete the $0^{th}$, $1^{st}$ and $2^{nd}$ layer decompositions.

Carrying out the decomposing and tracking steps concurrently means that data can be operated on in a nearly continuous manner without the need to move data to carry out subsequent decomposing steps.

It will be further appreciated that functions or structures of a plurality of components or steps may be combined into a single component or step, or the functions or structures of one-step or component may be split among plural steps or components. The present invention contemplates all of these combinations. Unless stated otherwise, dimensions and geometries of the various structures depicted herein are not intended to be restrictive of the invention, and other dimensions or geometries are possible. Plural structural components or steps can be provided by a single integrated structure or step. Alternatively, a single integrated structure or step might be divided into separate plural components or steps. In addition, while a feature of the present invention may have been described in the context of only one of the illustrated embodiments, such feature may be combined with one or more other features of other embodiments, for any given application. It will also be appreciated from the above that the fabrication of the unique structures herein and the operation thereof also constitute methods in accordance with the present invention. The present invention also encompasses intermediate and end products resulting from the practice of the methods herein. The use of "comprising" or "including" also contemplates embodiments that "consist essentially of" or "consist of" the recited feature.

The explanations and illustrations presented herein are intended to acquaint others skilled in the art with the invention, its principles, and its practical application. Those skilled in the art may adapt and apply the invention in its numerous forms, as may be best suited to the requirements of a particular use. Accordingly, the specific embodiments of the present invention as set forth are not intended as being exhaustive or limiting of the invention. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes.

What is claimed is:

1. A method of data compression, comprising:
    carrying out a first decomposing step, by at least one wavelet transform processing unit, on image data via discrete wavelet transform to produce a set of resultant wavelet coefficients;
    storing the set of resultant wavelet coefficients at known addresses in a non-transitory memory;
    tracking the known addresses of the set of resultant wavelet coefficients in a shared register by an address computation processing unit;
    identifying, by the address computation processing unit, a subset of resultant wavelet coefficients from the set of resultant wavelet coefficients;
    providing the known addresses of the subset of resultant wavelet coefficients from the set of resultant wavelet coefficients to the at least one wavelet transform processing unit; and
    carrying out at least one second decomposing step, by the at least one wavelet transform processing unit, on the subset of resultant wavelet coefficients from the set of resultant wavelet coefficients; wherein the set of resultant wavelet coefficients are kept at the known addresses in the non-transitory memory during the at least one second decomposing step.

2. The method of claim 1, wherein the set of resultant wavelet coefficients are designated as a $0^{th}$ layer, and wherein the step of identifying the subset of resultant wavelet coefficients from the set of resultant wavelet coefficients comprises selecting a subset of the wavelet coefficients corresponding to $2^N$ where N is the Nth layer of decomposition.

3. The method of claim 1, wherein the image data includes at least two image tiles, further comprising carrying out the first and at least one second decomposing steps for each of the at least two image tiles in parallel.

4. The method of claim 1, wherein the at least one wavelet transform processing unit and the address computation processing unit carry out each of the at least one second decomposing step and the tracking step in parallel with one another.

5. The method of claim 1, further comprising:
    identifying a set of non-consecutive known addresses of a subset of the set of resultant wavelet coefficients by the address computation processing unit;
    reading the corresponding subset of resultant wavelength coefficients located at the set of non-consecutive known addresses; and
    assembling the corresponding subset of resultant wavelength coefficients located at the set of non-consecutive known addresses into a JPEG2000 format.

6. The method of claim 1, wherein providing the known addresses of the subset of resultant wavelet coefficients from the set of resultant wavelet coefficients to the at least one wavelet transform processing unit comprises:
    storing, by the address computation processing unit, the known addresses of the subset of resultant wavelet coefficients from the set of resultant wavelet coefficients in a memory; and
    accessing, by the at least one wavelet transform processing unit, the known addresses of the subset of resultant wavelet coefficients from the set of resultant wavelet coefficients stored in the memory.

7. An image processing system, comprising:
    at least one data compression processing unit, including:
    1) at least one wavelet transform processing unit for decomposing data from an image into resultant wavelet coefficients via a plurality of operations using a discrete wavelet transform;
    2) a memory for storing each of the resultant wavelet coefficients at a known addresses; and
    3) an address computation processing unit including a register accessible by the at least one wavelet transform processing unit, for tracking the known addresses where each of the resultant wavelet coefficients is stored in the memory, wherein each of the resultant wavelet coefficients are held in place at the known addresses in the memory during subsequent operations of the plurality of operations of the at least one wavelet transform processing unit.

8. The system of claim 7, wherein the at least one wavelet transform processing unit decomposes data from the image at least 4 times.

9. The system of claim 7, wherein the at least one wavelet transform processing unit is configured to truncate the resultant wavelet coefficients.

10. The system of claim 9, further comprising a designated processor for assembling the truncated resultant wavelet coefficients into a JPEG2000 format.

11. The system of claim 7, wherein the data from the image includes data indicative of a plurality of image tiles.

* * * * *